Dec. 14, 1971   A. L. JOHNSON ET AL   3,627,504

METHOD OF ADDING COLORANT TO MOLTEN GLASS

Filed Dec. 29, 1969

United States Patent Office 3,627,504
Patented Dec. 14, 1971

3,627,504
METHOD OF ADDING COLORANT TO MOLTEN GLASS
Andrew L. Johnson, New Castle, and Leon F. Robertson, Brockway, Pa., assignors to Glass Container Industry Research Corporation, State College, Pa.
Filed Dec. 29, 1969, Ser. No. 888,324
Int. Cl. C03b 5/04
U.S. Cl. 65—135                                     3 Claims

ABSTRACT OF THE DISCLOSURE

Molten glass batch is colored by utilizing the hot products of combustion of a submerged burner unit to promote homogenous mixing of glass colorant added to the batch.

BACKGROUND OF THE INVENTION

In coloring glass, molten or base glass is customarily discharged from the melting chamber of a glass furnace and caused to flow through a channel or forehearth section of the glass furnace, wherein colorant materials and/or other modifiers affecting the composition and working charactericstics of the glass are mixed with the base glass, illustrative of such techniques being the Swain et al., U.S. Pat. Nos. 3,364,041 and 3,364,042. The forehearth section is designed to control temperature and condition the glass with forehearth section exit temperatures generally ranging from about 2,350° F. down to about 1,950° F., the latter temperature generally being the level where temperature and viscosity are proper for forming operations. While during melting and refining, glass temperature can be as high as 2,750° F. to 3,000° F., generally the base glass issuing from the melting tank or refiner and entering the forehearth has a temperature of from about 2,300° F. to about 2,600° F.

Glass colorant materials and modifiers may be employed in various forms, e.g., in the form of a frit or in molten condition. When the colorant is introduced into the glass in the form of a molten concentrated glass, it is generally fed from a furnace located above a colorant feeder as illustrated in the U.S. Pats. to Brosse, No. 2,115,408, and to Keefer, No. 3,343,935.

A frit most usually is preferred as the colorant however. The frit, which is a concentrate of colorant or modifier material in a glass carrier chemically compatible with the base glass and usually provided in powdered or granulated form, is discharged at a controlled rate from a frit feeder and is evenly spread over the surface of the flowing glass passing through a melting section of the forehearth. The frit is thereby melted and mixed to some extent with the base glass. The temperature in the melting section must be at least as high as the melting temperature of the frit and is usually maintained at about 2,200° F. to 2,300° F. Brown, U.S. Pat. No. 3,330,638, and Allman et al., U.S. Pat. No. 3,224,857, being illustrative of known techniques. The frit composition may be prepared by melting the raw batch materials in a separate unit melter under suitable conditions, e.g., oxidizing or reducing atmosphere, at a glass temperature of 2,700° F. to 2,900° F., thereafter cooling the melted colorant frit, and then reducing it to a powdered or granulated form, e.g., as described in Babcock, U.S. Pat. No. 3,024,120.

The amount of frit entering the forehearth is usually only a small fraction of the amount of base glass flowing from the glass furnace, the proportion of base glass-to-frit depending upon such variable factors as the composition of the frit and the intensity of the color desired in the end product. The ratio of base glass to frit can vary widely, e.g., from about 40:1 to 400:1 or higher.

In order to distribute the colorant throughout the base glass during its travel through the forehearth, mechanical mixing and stirring equipment has been proposed in the prior art, such devices ranging from single rotating impellers to complex combinations of screw type impellers. Illustrative of prior art mixing devices are shown in U.S. Pat. Nos. 2,115,408; 2,955,384; 3,330,638; 3,343,-935; 3,053,517; 3,057,175; 3,224,857; 3,328,150 and 3,330,638.

Difficulty has been experienced with such prior art mixing means in obtaining the thorough mixing of the frit or colorant with the base glass which is necessary to obtain a homogenous glass of uniform color. For example, iron chromite, which is a principal colorant in obtaining Emerald green, is not put into solution by conventional mechanical mixing. Furthermore, problems of crystallization of coloring ingredients, such as chromium oxides, primary colorants for greens, within either the highly colorant enriched frit or the composite glass, also have been encountered. If crystallization occurs within the frit, as by recrystallization of chromium oxides upon solidification of the frit after melting, such crystals generally show up in the composite glass.

Further problems have been encountered in attempting to add large amounts of solid frits, due to heat losses incurred upon admixing of the frit with the molten base glass in such quantities as to lower appreciably the temperature of the base glass below that desired during travel through the forehearth. This engenders serious mixing problems in that either the frit does not melt readily or it does not mix thoroughly with the base glass. In an effort to avoid this, booster heaters have been used to raise the forehearth temperature so as to enhance frit mixing and dispersion, as for example, in the manner shown in U.S. Pat. Nos. 2,115,408 and 3,224,857.

Other difficulties encountered in making several commercially important green glasses are due to the incompatibility with the colorant glass of decolorizers (e.g., selenium as in Silverman, U.S. Pat. No. 2,955,948) and the presence of reducing conditions. This has been somewhat ameliorated by the use of oxidizing agents, such as arsenic and sodium nitrate. However, precise quantitative controls must be maintained, as in Beck et al., U.S. Pat. No. 2,923,625. Other colors (e.g., amber) require that iron and sulfur, the coloring agents, be reduced from ferric and sulfate to ferrous and sulfide states, respectively. Therefore, reducing agents are added as frit components, as in Babcock, U.S. Pat. No. 3,326,702.

Furthermore, the color of glass may be varied as from blue-green to yellow-green by oxidizing base glass ingredients, such as selenium and iron (e.g., ferrous iron to ferric iron) while in the forehearth thus emphasizing the desirability of a capacity to maintain strict control of color and ambient conditions.

In some situations oxidation may be undesirable as when yellowing results from oxidizing $Cr_2O_3$ to $CrO_3$ due to the ambient oxidizing conditions in the forehearth. The yellowing may be masked with a toning agent (CuO) as in Swain et al., U.S. Pat. No. 3,364,042. The same effect may be achieved by removing the ambient air from the forehearth and replacing it with a neutral or reducing atmosphere.

Seeds, tiny bubbles or blisters in the finished product also can be a problem in coloring glass due to incompatibility leading to reaction between the added colorant and the base glass, producing gases, particularly when the added colorant contains a reducing agent. The agent breaks down the oxides and oxide complexes in the glass, releasing oxygen, and carbon dioxide or other gases. Regulation of the forehearth temperatures so that the glass will have a sufficiently high viscosity to form properly inhibits fining of the glass and removal of the seeds.

In the Babcock patent referred to above, in order to avoid the use of reducing agents in the frit, it is proposed to melt the frit batch in a separate melter or furnace under reducing, fining conditions created by decreasing the amount of oxygen to less that that necessary to effect complete combustion of the fuel gas and, if desired, to introduce reducing gases, such as hydrogen, carbon monoxide, methane, etc. It is also proposed that the atmosphere of the melting furnace may be an oxidizing one having an excess of $O_2$ so that the sulfur and iron in the base glass are in the unreduced state; while, in the forehearth, reducing conditions are established by using insufficient oxygen for complete combustion of the fuel so that the unreduced sulfur and iron in the base glass are converted or reduced while in the forehearth. This reduction is accomplished by stirring wherein the lower part of the molten glass is brought to the surface for reduction by a reducing gaseous atmosphere maintained above the glass.

SUMMARY OF THE INVENTION

The present invention relates to a process for coloring glass and more particularly a process wherein one or more submerged burner units are employed as means for introducing hot combustion products directly into the molten glass in the forehearth, the flame temperature achieved with such units being sufficient to put the colorant into solution in the base glass while it is being mixed therein by the turbulent mixing action of the combustion products issuing from the burner units. Operation of the submerged burner units preferably is in accordance with the technique described in the patent application of Andrew L. Johnson entitled "Melting Glass" filed on even date herewith. By virtue of the use of higher flame temperature, difficult to melt ceramic material colorants, such as iron chromite, readily go into solution in the molten base glass thereby effecting uniform dispersion thereof eliminating the presence of colorant stones or lumps in the molten base glass.

Another advantage of coloring glass according to the present invention is that the practical necessity of using a frit is avoided and material which is 100% colorant or pigment may be used. Thus, heat need not be expended to melt carriers and diluents, and problems such as heat losses and recrystallization of chromium oxide colorants associated with frit addition are not encountered.

A further advantage of coloring glass according to this invention is that conventional mixing of the glass promoted by passage of highly heated products of combustion therethrough ensures faster and more uniform incorporation of colorants into the base glass than has been obtainable heretofore with conventional mechanical mixing and stirring equipment.

According to the present invention, oxidizing and/or reducing conditions necessary for obtaining certain colors and glass characteristics are created and maintained throughout the glass melt, not just in the atmosphere above the base glass, by altering the oxygen-gas ratio supplied to the burner. To obtain such conditions, it was previously necessary to introduce into the base glass reducing or oxidizing agents by approximation or trial and error methods. Thus, an important advantage of this invention is improved control of such conditions with precision and accuracy. This is achieved without the addition to the base glass of oxidizing agents or of reducing agents with their attendant deleterious effects on color. However, such agents may still be employed but better control of conditions is achieved according to the present invention. Eliminating reducing agents also avoids seeds which result from the action of such agents on oxides in the molten glass and which action liberates oxygen, $CO_2$ and other gases.

No additional reducing gases, such as hydrogen, carbon monoxide or methane, or toning agents to mask color changes resulting from oxidation or reduction are needed. Furthermore, maintenance of the proper oxidizing or reducing conditions is achieved without the use of sepparate frit melters or by stirring.

DESCRIPTION OF THE PREFERRED EMBODIMENTS

For further understanding of the invention, reference should be made to the following detailed description taken in conjunction with the accompanying drawings in which.

The present invention is concerned with coloring glass batch in such manner as to provide optimum mixing of the colorant with the base glass batch to achieve greatest possible homogeneity of coloration in the batch.

Figure 1:
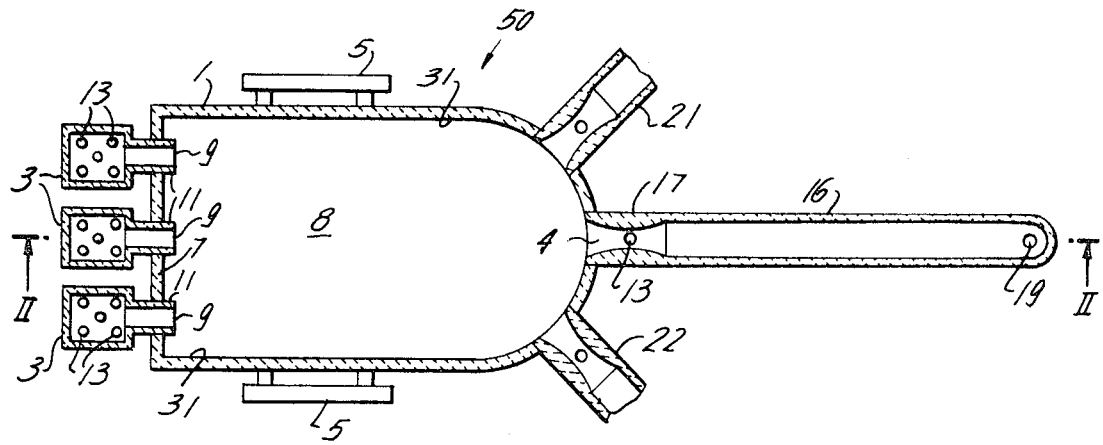
FIG. 1 is a schematic view, in horizontal section, of a glass furnace including a forehearth section in which glass can be colored in accordance with the principles of the present invention.

Turning now to a consideration of the apparatus shown in FIG. 1, glass-making ingredients are introduced into the melting chamber or chambers 3 of a glass furnace 50 with the former being designed to be fired with submerged burner unit equipment 13 which, in accordance with the invention described in the earlier-mentioned and concurrently filed application of Andrew L. Johnson, are supplied with a gaseous fuel, e.g., natural gas, and an oxidizing medium essentially free of nitrogen. The highly heated, high velocity products of combustion enter the batch at the bottom and pass upwardly therethrough rapidly heating the batch ingredients which in time become molten to form a body of glass. The melted glass then flows to the refining zone 1 of the glass furnace wherein it is fined to remove or liberate "seeds" (predominantly occluded nitrogen) which become entrapped in the glass body during melting. The refining zone can be provided with suitable heating means to insure proper fining temperatures, such means being a conventional feature on glass furnaces and being shown diagrammatically on each side of the furnace as at 5. The furnace 50 also can be provided with a roof (not shown), an end wall 7, a floor 8, and side walls 31 through which the heating means 5 extend. The refined glass can then be flowed from the refining zones to and through the forehearth section 16 of the glass furnace wherein coloring of the glass is effected.

Figure 2:
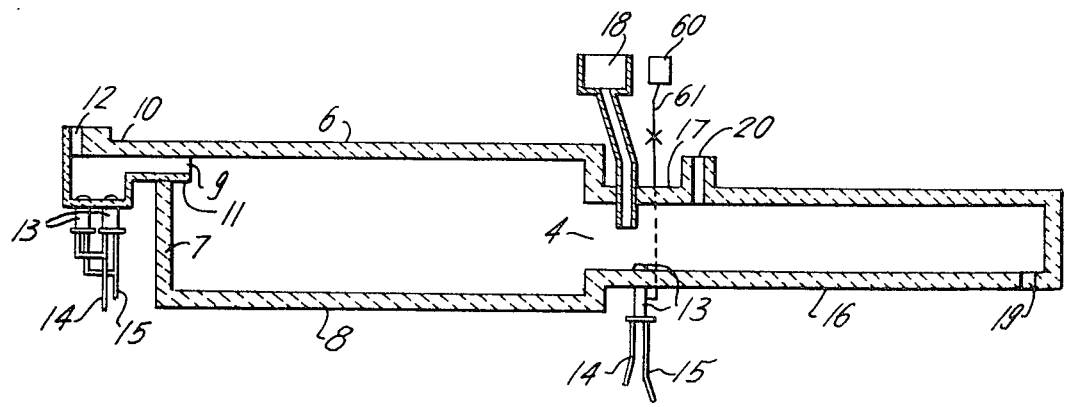
FIG. 2 is a sectional view of the apparatus shown in FIG. 1 as taken along the line II—II.

As can be best seen in FIG. 2, the forehearth 16 includes a melting section 17, a colorant feeder unit 18 mounted over the melting section and a suitable venting outlet 20. As will be noted, the present invention provides that the colorant, e.g., iron chromite can be added directly to the batch in raw form, i.e., without need to provide a carrier or vehicle for the colorant such as a frit. The forehearth 16 also is provided at its forward end with an outlet 19 or other means for the discharge of the glass. A plurality of forehearths 21 and 22 can be provided as are shown in FIG. 2 and if such be the case it will be understood that colorant feeder units and submerged burner units are provided in each forehearth in the manner to be described now.

The melting section 17 of each forehearth is provided with at least one submerged burner unit 13 which extends through the bottom of the section below the level of the glass therein and the burner unit is supplied with a gaseous fuel and an oxidizing medium having a nitrogen content below the nitrogen content of air, preferably substantially below that of air and most preferably devoid of nitrogen, although it will be understood that air could be used if appropriate fining were carried out after coloring and if the nitrogen added to the colored glass by the combustion with air did not have adverse effect on the coloring property to be achieved. The fuel and oxidizing manifolds are shown at 14 and 15, respectively. As was indicated earlier, the hot products of combustion exiting the submerged burner unit 13 enter the glass at the bottom thereof and cause convection currents within the glass batch contributing to thorough mixing of the colorant added thereto from feeder unit 18. Furthermore, the hot products of combustion cause swirling-agitation within the glass to further contribute to complete homogenization of the molten glass and colorant.

The colored molten glass then moves through the forehearth where it is refined and conditioned, with liberated gas exiting through venting outlet 20.

When coloring glass according to the present invention, i.e., using submerged burner units means for introducing hot combustion products directly into the molten base glass below the surface thereof to promote optimum mixing of base glass and colorant, such coloring operation could be effected in the forehearth, at a location after the forehearth, or are between the forehearth and the refining zone of the furnace.

According to the present invention colorant or modifier can be introduced into the forehearth at or near the entrance thereof by conventional means. This coloring section of the forehearth is provided with at least one submerged unit extending into the bottom of the forehearth below the level of glass therein. Preferably more than one submerged burner unit is provided and preferably they are of smaller dimension and capacity than those employed in the melting zone.

The temperature of the combustion products in the submerged burner unit according to the preferred embodiment of the present invention, that is, where the oxidizing medium is essentially pure oxygen or an oxygen enriched air mixture is on the order of about 4,500° F., as contrasted with about 3,400° F. for submerged burners supplied with air and about 2,800° F. for conventional top surface heating, which temperature (4,500° F.) is sufficient to melt and put the colorant into solution in the molten base glass.

By proper adjustment of the oxdizing medium/gas ratio the desired conditions, oxidizing, stoichiometric or reducing, may be maintained. Stoichiometrically, two parts of oxygen, for example, is sufficient per part of fuel gas.

The following example is illustrative of the invention.

Soda lime batch ingredients are fired in a glass melting furnace at a crown temperature of about 2,350° F. the glass melting furnace being provided with separate melting and refining sections and equipped with a plurality of burners located in the floor of the melting section. Each burner is supplied with an oxygen source, e.g., bottle oxygen at 99+% purity. The base glass when molten outflows from the melter and passes to the refining zone where a fining temperature is maintained at about 2,700° F.

A plurality of forehearths or channels extend from the refiner and each is equipped with facilities to add colorant. The base glass after being fined is passed from the refiner into the forehearth sections at a total rate of 30 tons per day entering the forehearths at a temperature of about 2,600° F. Submerged burner units 13 are located in the bottom of the coloring section of each forehearth near the point of discharge from the furnace refiner and are so positioned that their nozzles are approximately level with the floor of that section for submerged burning. Each burner is supplied with oxygen as an oxidizing medium and natural gas as fuel.

Colorant is fed from the feeder unit 18 mounted above the entrance of the forehearth near the discharge end of the refiner and is designed to provide about ten pounds per hour of iron chromite. The colorant is fed from feeder unit 18 at a rate commensurate with the capacity of the furnace and enters the molten glass, being mixed thoroughly therewith by the action of the highly heated effluent entering the forehearth from the submerged burner unit 13. The action of the hot gases of combustion in their passage upwardly through the glass batch creates a substantial agitation of the glass and movement of the same which insures the achievement of homogeneity of mix of the colorant throughout the batch. The colored glass is thereafter withdrawn from the forehearth at about 2,250° F. and formed into glass bottles.

From the foregoing it will be seen that the present invention provides an improved and most efficient mode of adding color to glass, utilizing for that purpose a submerged burner unit in the forehearth section to effect the requisite mixing action within the batch. In addition to utilization of a colorant feeder unit of the description above given is also possible to entrain the colorant in the effluent of hot products of combustion issuing from the submerged burner unit. Thus as may be seen in FIG. 2, a feeder unit such as 60 can be provided to hold a quantity of powdered iron chromite, the unit 60 being connected by means of a suitable conduit 61 with the combustion chamber of the burner unit 13. Suitable control means to control colorant flow from the unit 60 downwardly to the burner unit can be provided. The entrapment of the colorant in this manner is particularly advantageous in that the iron chromite is readily vaporized in the burner unit so that it is more easily introduced to the molten glass batch and more readily becomes dispersed therethrough.

What is claimed is:

1. In a process for making colored glass which includes the steps of melting glass batch to form molten base glass, adding colorant to the molten base glass, and introducing the products of combustion of a gaseous fuel into the molten base glass at a submerged level therein so to effect thorough mixing together of the colorant with the base glass, the improvement wherein the gaseous fuel is combusted in an oxidizing medium having a nitrogen content substantially below the nitrogen content of air.

2. The process of claim 1 wherein the oxidizing medium is essentially pure oxygen and the colorant is added directly to the glass in raw form.

3. The process of claim 1 wherein the oxidizing medium is essentially pure oxygen and the colorant is added to the molten base glass by entraining it in the products of combustion before they are introduced into the base glass.

References Cited

UNITED STATES PATENTS

| | | | |
|---|---|---|---|
| 2,634,555 | 4/1953 | Henry et al. | 65—135 |
| 3,260,587 | 7/1966 | Dolf et al. | 65—135 |

ARTHUR D. KELLOGG, Primary Examiner

U.S. Cl. X.R.

65—136